(12) United States Patent
Yu et al.

(10) Patent No.: US 11,211,989 B2
(45) Date of Patent: Dec. 28, 2021

(54) METHODS AND NODES FOR BEAM ADJUSTMENT

(71) Applicant: JRD COMMUNICATION (SHENZHEN) LTD., Shenzhen (CN)

(72) Inventors: Qiaoling Yu, Shenzhen (CN); Ting Zhou, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 0 days.

(21) Appl. No.: 16/494,887

(22) PCT Filed: Mar. 17, 2017

(86) PCT No.: PCT/CN2017/077076
§ 371 (c)(1),
(2) Date: Sep. 17, 2019

(87) PCT Pub. No.: WO2018/165977
PCT Pub. Date: Sep. 20, 2018

(65) Prior Publication Data
US 2020/0044722 A1 Feb. 6, 2020

(51) Int. Cl.
*H04B 7/06* (2006.01)
*H04B 17/336* (2015.01)
*H04L 5/00* (2006.01)
*H04W 16/28* (2009.01)
*H04W 52/24* (2009.01)
*H04W 72/04* (2009.01)

(52) U.S. Cl.
CPC ......... *H04B 7/0695* (2013.01); *H04B 7/0617* (2013.01); *H04B 17/336* (2015.01); *H04L 5/0048* (2013.01); *H04W 16/28* (2013.01); *H04W 52/24* (2013.01); *H04W 72/0406* (2013.01)

(58) Field of Classification Search
CPC .... H04B 7/024; H04B 7/0408; H04B 7/0617; H04B 7/0695; H04B 17/336; H04B 17/345; H04W 52/244; H04W 72/082; H04W 72/085; H04W 16/28; H04W 52/24; H04W 72/0406; H04L 5/0048
See application file for complete search history.

(56) References Cited

U.S. PATENT DOCUMENTS 9,571,336 B2 * 2/2017 Hamalainen .......... H04W 24/02
9,923,682 B2 3/2018 Jeong et al.
(Continued)

FOREIGN PATENT DOCUMENTS

CN 101877853 A 11/2010
EP 3082274 A1 10/2016
(Continued)

*Primary Examiner* — Sophia Vlahos
(74) *Attorney, Agent, or Firm* — Hamre, Schumann, Mueller & Larson, P.C.

(57) ABSTRACT

Methods for beam adjustment are disclosed. A method includes: determining, by a first node, whether a beam adjustment is required; and when the beam adjustment is required, at least adjusting, by the first node, its beam, or informing, by the first node, a neighboring second node of adjusting the second node's beam, so that relationship between the beam of the first node and the beam of the second node meets a preset condition. There are also provided associated nodes.

35 Claims, 6 Drawing Sheets

(56) References Cited

U.S. PATENT DOCUMENTS

| | | | |
|---|---|---|---|
| 2004/0048635 A1 | 3/2004 | Goldberg | |
| 2011/0064115 A1* | 3/2011 | Xu | H04L 5/0094 |
| | | | 375/130 |
| 2013/0094522 A1* | 4/2013 | Moshfeghi | H04W 88/02 |
| | | | 370/498 |
| 2013/0095846 A1* | 4/2013 | Brisebois | H04W 24/10 |
| | | | 455/456.1 |
| 2014/0329485 A1* | 11/2014 | Calin | H04B 7/024 |
| | | | 455/296 |
| 2016/0323075 A1* | 11/2016 | Jeong | H04L 5/0032 |
| 2018/0054744 A1* | 2/2018 | Smith | H04W 72/046 |
| 2018/0062721 A1* | 3/2018 | Cho | H04B 7/024 |
| 2018/0109962 A1 | 4/2018 | Nilsson et al. | |
| 2018/0254809 A1* | 9/2018 | Huang | H04W 72/082 |
| 2019/0380082 A1* | 12/2019 | Kim | H04W 36/0061 |

FOREIGN PATENT DOCUMENTS

| | | | |
|---|---|---|---|
| WO | 2016141966 A1 | 9/2016 | |
| WO | WO-2018034703 A1 * | 2/2018 | H04B 7/088 |

* cited by examiner

S20 — Second node transmiting information of its beam to the first node
FIG. 15
S31 — Central node receiving a beam adjustment request from a first node
S32 — Central node transmitting a beam adjustment command message to at least the first node or a second node to execute the beam adjustment
FIG. 16
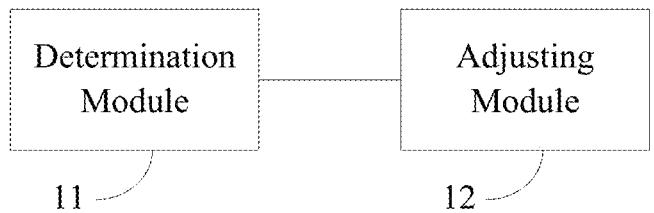
FIG. 17
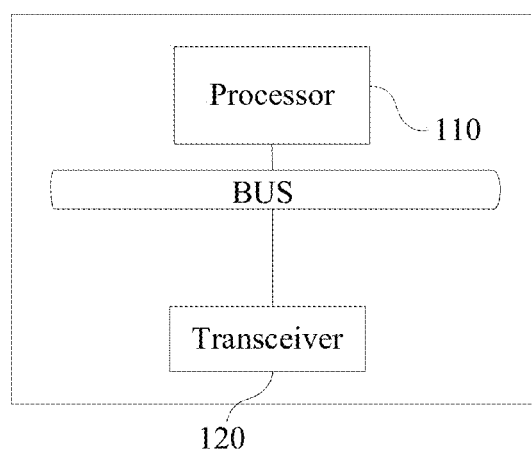
FIG. 18

METHODS AND NODES FOR BEAM ADJUSTMENT

TECHNICAL FIELD

Embodiments of the present disclosure generally relate to communications, and more particularly relate to methods and nodes for beam adjustment.

BACKGROUND

To satisfy the requirements of various 5G use cases, operation over frequency ranges up to 100 GHz is considered in new radio (NR). However, here comes the challenges of fragile radio link and high penetration loss especially for the high frequency scenario, and hence beamforming becomes an essential technique to address those problems.

Due to the high frequency characteristics, nodes can only cover an area with a small distance, and the density of deployed nodes will be very high to guarantee the coverage. When there are multiple nodes in a given area, due to random deployment of high frequency nodes and beams' sudden SINR drops due to radio environment change, the radio network coverage may be uneven. The non-uniform radio network coverage may cause some problems, e.g. inter-node interference due to beam overlapped, beam blocked, beam coverage hole etc., which will be described in greater detail below with reference to the accompanying drawings.

As shown in FIG. 1, for example, node 1 and node 2 are deployed close enough, and the beams generated by the two nodes are overlapped with each other. User Equipment (UE) A locating in the beam overlapped area receives and measures multiple nodes' beams, which will increase its measurement and signaling overhead. If the overlapped beams use the same or adjacent frequency, there will be inter-node interference.

As shown in FIG. 2, for example, UE B is serviced by node 4 with its beam. Due to the high frequency characteristic, a sudden obstacle represented by a block may block the beam between UE B and node 4. The beam blocked area is represented by dashed part of beams. Signal strength of beams from node 4 may be low, which will decrease UE B's experience.

As shown in FIG. 3, for example, UE C locates in the beam coverage hole of node 5 and node 6, and signal strength of beams of node 5 and node 6 may be low, which may lead to failure of UE C's access to node 5 or node 6.

SUMMARY

In view of the above, embodiments of the present disclosure provide methods and nodes for beam adjustment, aiming at addressing the issues of non-uniform radio network coverage.

There is provided a method for beam adjustment, the method comprising: determining, by a first node, whether a beam adjustment is required; and when the beam adjustment is required, at least adjusting, by the first node, its beam, or informing, by the first node, a neighboring second node of adjusting the second node's beam, so that relationship between the beam of the first node and the beam of the second node meets a preset condition.

There is also provided a method for beam adjustment, the method comprising: receiving, by a second node, a beam adjustment notification from a neighboring first node, wherein the beam adjustment notification is transmitted from the first node when a beam adjustment is required; adjusting, by the second node, its beam in response to the beam adjustment notification, so that relationship between beam of the first node and the beam of the second node meets a preset condition.

There is also provided a method for beam adjustment, the method comprising: receiving, by a central node, a beam adjustment request from a first node, wherein the beam adjustment request is transmitted when a beam adjustment is required; and transmitting, by the central node, a beam adjustment command message to at least the first node or a second node to execute the beam adjustment, so that relationship between beam of the first node and beam of the second node meets a preset condition.

There is also provided a node comprising: a determination module configured to determine whether a beam adjustment is required; and an adjusting module configured to at least adjust beam of the node or informing a neighboring second node of adjusting the second node's beam when the beam adjustment is required, so that relationship between the beam of the node and the beam of the second node meets a preset condition.

There is also provided a node comprising: a receiving module configured to receive a beam adjustment notification from a neighboring first node, wherein the beam adjustment notification is transmitted from the first node when a beam adjustment is required; and an adjusting module configured to adjust beam of the node in response to the beam adjustment notification, so that relationship between beam of the first node and the beam of the node meets a preset condition.

There is also provided a node comprising: a receiving module configured to receive a beam adjustment request from a first node, wherein the beam adjustment request is transmitted when a beam adjustment is required; and a transmission module configured to transmit a beam adjustment command message to at least the first node or a second node to execute the beam adjustment, so that relationship between beam of the first node and beam of the second node meets a preset condition.

There is also provided a node comprising a processor and a transceiver coupled to the processor; the processor being configured to: determine whether a beam adjustment is required; and when the beam adjustment is required, at least adjust beam of the node, or inform via the transceiver a neighboring second node of adjusting the second node's beam, so that relationship between the beam of the node and the beam of the second node meets a preset condition.

There is also provided a node comprising a processor and a transceiver coupled to the processor; the processor being configured to: receive via the transceiver a beam adjustment notification from a neighboring first node, wherein the beam adjustment notification is transmitted from the first node when a beam adjustment is required; and adjust beam of the node in response to the beam adjustment notification, so that relationship between beam of the first node and the beam of the node meets a preset condition.

There is also provided a node comprising a processor and a transceiver coupled to the processor; the processor being configured to: receive via the transceiver a beam adjustment request from a first node, wherein the beam adjustment request is transmitted when a beam adjustment is required; and transmit via the transceiver a beam adjustment command message to at least the first node or a second node to execute the beam adjustment, so that relationship between beam of the first node and beam of the second node meets a preset condition.

According to the Summary above, when there is a problem caused by the non-uniform radio network coverage, e.g. beam overlapped, beam blocked or beam coverage hole, a beam adjustment can be executed by the first node and/or the second node accordingly, so that relationship between beam of the first node and beam of the second node meets a preset condition. The uniformity of radio network coverage can be improved through cooperation between the first node and the second node.

BRIEF DESCRIPTION OF THE DRAWINGS

FIG. 15 is a flowchart illustrating a ninth embodiment of the method for beam adjustment according to the disclosure.

FIG. 16 is a flowchart illustrating a tenth embodiment of the method for beam adjustment according to the disclosure.

FIG. 17 is a block diagram illustrating a first embodiment of a node according to the disclosure.

FIG. 18 is a block diagram illustrating a second embodiment of the node according to the disclosure.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment," do not necessarily refer to the same embodiment. Particular features, structures, or characteristics may be combined in any suitable manner consistent with this disclosure. Various modules, units, circuits, or other components may be described or claimed as "configured to" perform a task or tasks. In such contexts, "configured to" is used to connote structure by indicating that the modules/units/circuits/components include structure (e.g., circuitry) that performs those task or tasks during operation. As such, the modules/units/circuits/components can be said to be configured to perform the task even when the specified module/unit/circuit/component is not currently operational (e.g., is not on). The modules/units/circuits/components used with the "configured to" language include hardware—for example, circuits, memory storing program instructions executable to implement the operation, etc. Reciting that a module/unit/circuit/component is "configured to" perform one or more tasks is expressly intended not to invoke 35 U.S.C. § 112(f), for that module/unit/circuit/component. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. As used herein, the term "based on" describes one or more factors that affect a determination. This term does not foreclose additional factors that may affect the determination. That is, a determination may be solely based on those factors or based, at least in part, on those factors. Consider the phrase "determine A based on B." While in this case, B is a factor affects the determination of A, such a phrase does not foreclose the determination of A from also being based on C. In other instances, A may be determined based solely on B. Beam of the node or the node's beam may comprise one or more beams transmitted from the node. Beam of the first node or the first node's beam may comprise one or more beams transmitted from the first node. Beam of the second node or the second node's beam may comprise one or more beams transmitted from the second node.

DETAILED DESCRIPTION

Figure 1:
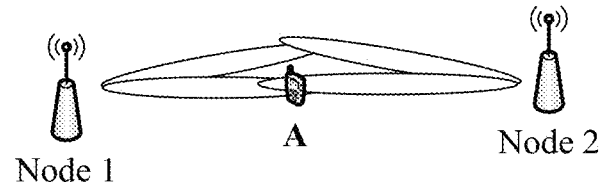
FIG. 1 is a schematic diagram of related art illustrating a beam overlapped caused by the non-uniform radio network coverage.
Figure 2:
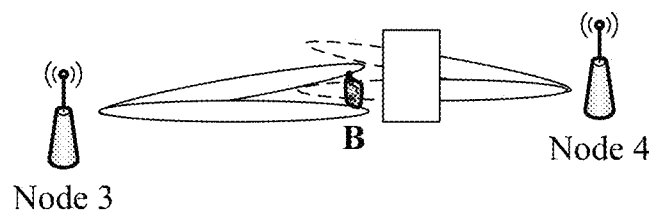
FIG. 2 is a schematic diagram of related art illustrating a beam blocked caused by the non-uniform radio network coverage.
Figure 3:
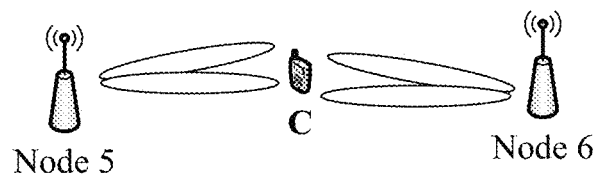
FIG. 3 is a schematic diagram of related art illustrating a beam coverage hole caused by the non-uniform radio network coverage.
Figure 4:
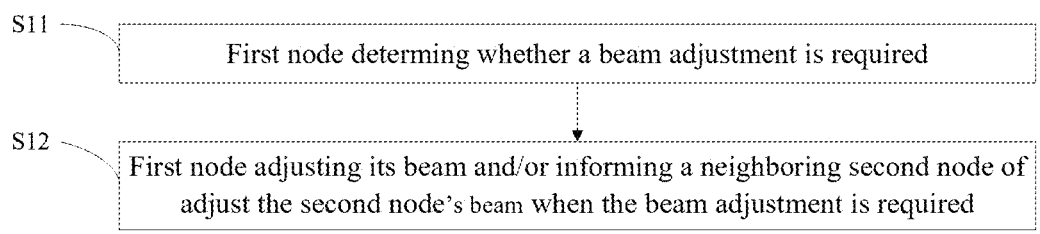
FIG. 4 is a flowchart illustrating a first embodiment of a method for beam adjustment according to the disclosure.

Referring to FIG. 4, a flowchart is depicted illustrating a first embodiment of a method for beam adjustment according to the disclosure. The method can be implemented on a first node.

The first node may be a base station, which is connected to a core network and performs radio communications with multiple User Equipments (UEs) thus providing communications coverage for the associated geographical area. The base station may comprise, but are not limited to, macro base stations, micro base stations, pico base stations, or femto base station. In various embodiments, a base station is also be interchangeably referred to as a wireless base station, an access point, a Node B, an evolved Node B (eNodeB or eNB), gNB and so forth. If the radio access network is a central unit (CU)/distributed unit (DU), or other similar architectures, the base station can be used to represent the CU and the multiple DUs under control of the CU. In CU/DU architecture, a CU connects to and controls multiple DUs, the CU and DUs both carrying an air interface protocol stack.

The first node may also be a DU in the CU/DU architecture, or a transmission point (TP), transmission reception point (TRP), or radio remote head (RRH) in other similar architectures.

The method may comprise the following blocks.

In S11, the first node may determine whether a beam adjustment is required.

The beam adjustment may be event-triggered. A triggering event for beam adjustment may be referred as an adjustment triggering event and caused by non-uniform radio network coverage. The adjustment triggering events may comprise beam overlapped, beam blocked and beam coverage hole.

The first node may determine whether an adjustment triggering event has occurred according to information of beam of the first node and/or a neighbor second node. The second node may be a base station or a DU/TP/TRP/RRH in a CU/DU or other similar architectures. When the first node and the second node are both DUs/TRPs/TPs/RRHs, the two nodes can connect to the same CU/gNB.

The first node may be neighbor to one or more nodes. When the first node is neighbor to more than one node, the first node can execute the determination for each neighboring node as the second node respectively.

In S12, the first node may adjust its beam and/or inform a neighboring second node of adjusting the second node's beam when the beam adjustment is required.

When an adjustment triggering event has occurred, the first node may cooperate with the second node on the beam adjustment according to the adjustment triggering event, so that the relationship between the beam of the first node and the beam of the second node meets a preset condition. The beam adjustment executed by the first node and/or the second node may comprise adjustment of direction and/or power of its corresponding beam which needs to be adjusted. The preset condition may comprise eliminating the adjustment triggering event.

In one embodiment, signal/channel of the first node may be transmitted in a beam-sweeping mode, and the beam adjustment may comprise adjustment of at least one of the beam's direction, power and time allocations. By beam-sweeping mode, it means that a same signal or channel is carried by at least two beams of the first node and transmitted in at least two time units in one cycle. The time allocation of a beam may comprise the length of a sweeping cycle and/or which time unit(s) the beam occupies in one cycle.

According to the above embodiment, when there is a problem caused by the non-uniform radio network coverage, e.g. beam overlapped, beam blocked or beam coverage hole, a beam adjustment can be executed by the first node and/or the second node accordingly, so that relationship between beam of the first node and beam of the second node meets a preset condition. The uniformity of radio network coverage can be improved through cooperation between the first node and the second node.

Figure 5:
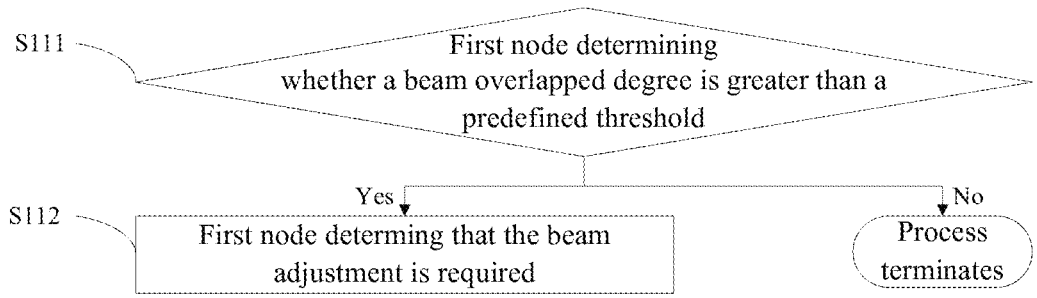
FIG. 5 is a flowchart illustrating a second embodiment of the method for beam adjustment according to the disclosure.

Referring now to FIG. 5, a flowchart is depicted illustrating a second embodiment of the method for beam adjustment according to the disclosure, which is based on the first embodiment of the method for beam adjustment and in which the block S11 further comprises the following blocks.

In S111, the first node may determine whether a beam overlapped degree is greater than a predefined threshold.

The beam overlapped degree may comprise the number of the beam of the second node obtained by the first node and/or signal strength of the beam of the second node obtained by the first node. The signal strength of a beam may comprise absolute and/or strength signal strength of the beam. Compared with the number of beam of a same second node, the signal strength of beam is more accurate while leading to higher signaling overhead since the first node needs to obtain signal strength of each beam of the second node for estimation. If the beam overlapped degree comprises both the number and the signal strength(s) of the second node's beam, the logical combination of the two can be and/or.

If the beam overlapped degree is greater than the predefined threshold, jump to block S112; otherwise the process terminates.

In S112, the first node may determine that the beam adjustment is required.

The beam overlapped degree being greater than a predefined threshold means that the beam overlapped has occurred. Jump to the following blocks.

The first node and/or the second node may adjust at least one of direction, time allocation and power of its corresponding beam to reduce the beam overlapped degree. The corresponding beam may comprise the overlapped beam. The preset condition may comprise the beam overlapped degree being no greater than the predefined threshold.

Figure 6:
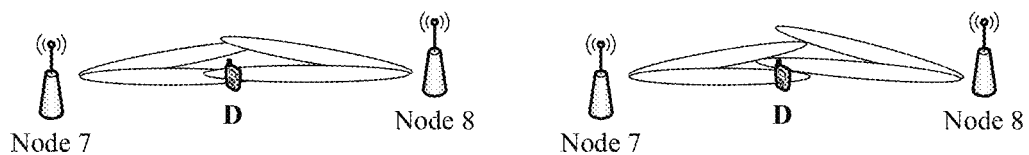
FIG. 6 is a schematic diagram illustrating a gear-type mode beam adjustment according to the disclosure.

The first node and/or the second node may adjust its corresponding beam in a gear-type mode, i.e. the first node and/or the second node adjust direction and/or time allocation (if the signal/channel is transmitted in a beam-sweeping mode) of corresponding beam, so that after adjustment, beams of the two nodes tend to complement one another. As shown in FIG. 6, for example, left part of the figure represents beams of node 7 and 8 before adjustment, and right part of the figure represents beams after adjustment. Node 8 adjusts direction of its beams according to the direction of node 7's beams, so that the two nodes can transmit the beams complementarily.

Figure 7:
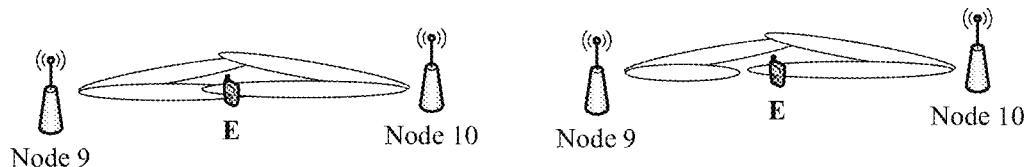
FIG. 7 is a schematic diagram illustrating a power control mode beam adjustment according to the disclosure.
Figure 8:
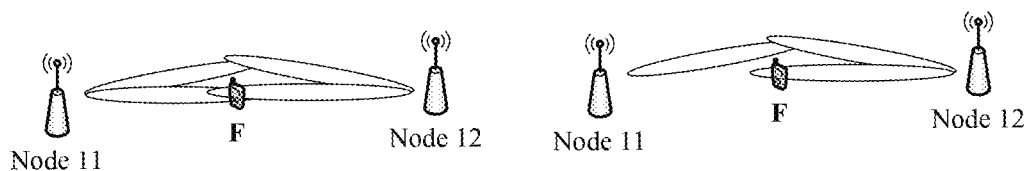
FIG. 8 is a schematic diagram illustrating a beam skipping mode beam adjustment according to the disclosure.

The first node and/or the second node may adjust power of corresponding beam, i.e. in a power control mode. As shown in FIG. 7, for example, left part of the figure represents beams of node 9 and 10 before adjustment, and right part of the figure represents beams after adjustment. Node 9 decreases power of its corresponding beam to decrease the beam overlapped degree. Specially, the first node/the second node can skip corresponding beam by decreasing its power to 0, i.e. in a beam skipping mode. As shown in FIG. 8, for example, left part of the figure represents beams of node 11 and 12 before adjustment, and right part of the figure represents beams after adjustment. Node 11 skips its corresponding beam to decrease the beam overlapped degree.

According to the above embodiment, the beam adjustment executed by the first node and/or the second node may reduce the beam overlapped degree, so that measurement and signaling overhead for UE and inter-node interference may be reduced.

Figure 9:
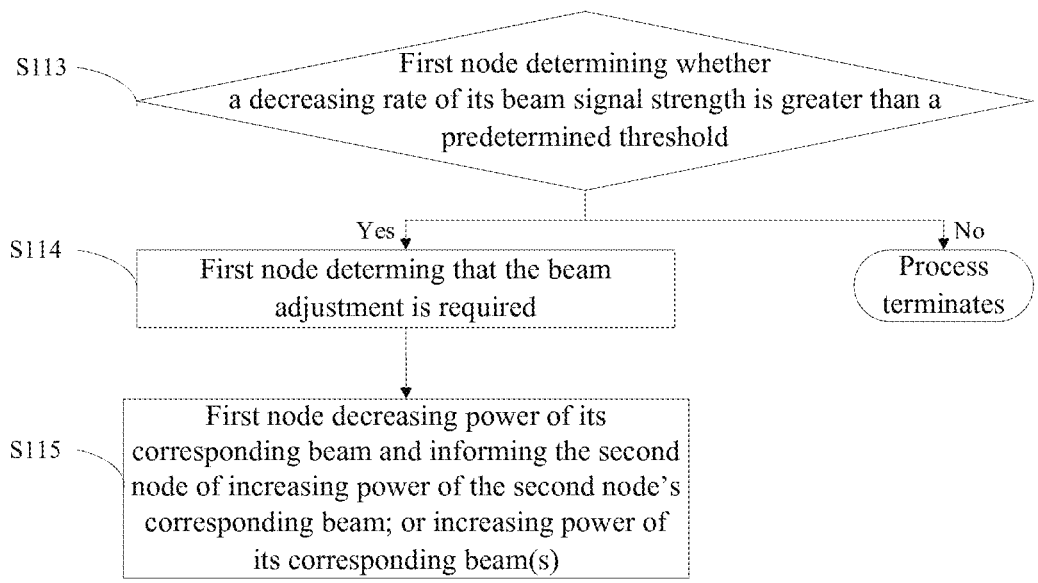
FIG. 9 is a flowchart illustrating a third embodiment of the method for beam adjustment according to the disclosure.

Referring now to FIG. 9, a flowchart is depicted illustrating a third embodiment of the method for beam adjustment according to the disclosure, which is based on the first embodiment of the method for beam adjustment and in which the adjustment triggering event is beam blocked. The present embodiment is a further extension of the first embodiment downlink transmission method, so the common contents as those of the first embodiment will not be detailed again. The method according to the present embodiment can comprise the following blocks.

In S113, the first node may determine whether a decreasing rate of its beam signal strength is greater than a predetermined threshold.

The first node may receive the decreasing rate of its beam' signal strength from connected UE, or receive signal strength of its beam from connected UE and then calculate the decreasing rate itself. If the signal strength is reported by the UE every fixed cycle, the calculation of the decreasing rate can be simplified to current signal strength minus the last one.

If the decreasing rate of its beam signal strength is greater than the predetermined threshold, jump to block S114; otherwise the process terminates.

In S114, the first node may determine that the beam adjustment is required.

The decreasing rate of its beam signal strength being greater than the predetermined threshold meaning that the beam blocked has occurred. Jump to block S115.

In S115, the first node may decrease power of its corresponding beam and inform the second node of increasing power of the second node's corresponding beam; or increase power of its corresponding beam.

The first node may decrease power of its corresponding beam and inform the second node of increasing power of corresponding beam of the second node, so that the UE served by the blocked beam may switch to the second node. The corresponding beam of the first node may comprise the blocked beam, i.e. the beam with a decreasing rate of its signal strength greater than the predetermined threshold. The corresponding beam of the second beam may comprise a beam approximately pointing to the blocked beam. The preset condition may comprise signal strength of the second node's beam being greater than a preset threshold. The first node may skip its corresponding beam to further reduce power consumption.

Alternatively, the first node may increase power of its corresponding beam against deterioration of the radio network due to the sudden obstacle. The corresponding beam of the first node may comprise the blocked beam. The preset condition may comprise signal strength of beam of the first node being greater than a preset threshold.

According to the above embodiment, after beam adjustment, UE located in the beam blocked area may switch to the second node or still be served by beam of the first node with higher power, so that signal strength of the UE's serving beam may be increased.

Figure 10:
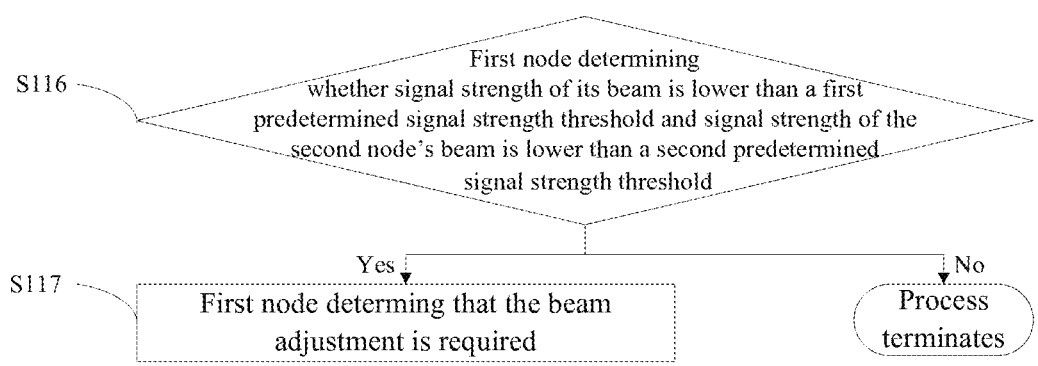
FIG. 10 is a flowchart illustrating a fourth embodiment of the method for beam adjustment according to the disclosure.

Referring now to FIG. 10, a flowchart is depicted illustrating a fourth embodiment of the method for beam adjustment according to the disclosure, which is based on the first embodiment of the method for beam adjustment and in which block S11 further comprises the following blocks.

In S116, the first node may determine whether signal strength of its beam is lower than a first predetermined signal strength threshold and signal strength of the second node's beam is lower than a second predetermined signal strength threshold.

The first predetermined signal strength threshold may be equal to the second predetermined signal strength threshold or not. If the signal strength of its beam is lower than the first predetermined signal strength threshold and the signal strength of the second node's beam is lower than the second predetermined signal strength threshold, jump to block S117; otherwise the process terminates.

In S117, the first node may determine that the beam adjustment is required.

The signal strength of its beam being lower than the first predetermined signal strength threshold and the signal strength of the second node's beam being lower than the second predetermined signal strength threshold means that the beam coverage hole has occurred. Jump to the following blocks.

The first node and/or the second node may adjust direction and/or power of its corresponding beam. The corresponding beam of the two nodes may comprise beam pointing to or close to the beam coverage hole. Typically, at least one of adjusted beam may point to the beam coverage hole with power high enough for serving UE. The preset condition comprises signal strength of beam of the first node and/or the second node being no lower than the predetermined signal strength threshold.

According to the above embodiment, after beam adjustment, UE located in the beam coverage hole may be served by adjusted beam of the first node or second with higher power, so that signal strength of the UE's serving beam may be increased and failure rate of the UE's access to connected node may be decreased.

Figure 11:
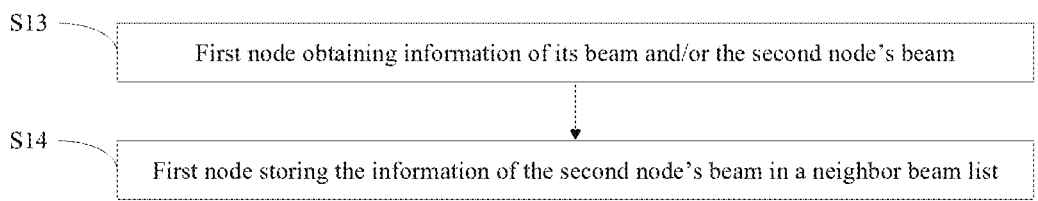
FIG. 11 is a flowchart illustrating a fifth embodiment of the method for beam adjustment according to the disclosure.

Referring now to FIG. 11, a flowchart is depicted illustrating a fifth embodiment of the method for beam adjustment according to the disclosure, which is based on the first embodiment of the method for beam adjustment and further comprises the following blocks before the block S11. The present embodiment can be combined with any embodiment of the method for beam adjustment according to the disclosure.

In S13, the first node may obtain information of its beam and/or the second node's beam.

The information of the first node's beam may comprise signal strength. The first node may receive measurement results of its beam from one or more UEs to obtain the signal strength. Beams in the measurement results reported by the UE may comprise other beam of the first node that can be measured in addition to the connected beam. Alternatively, the first node may measure uplink reference signal transmitted from one or more UEs to obtain the signal strength. Since the UE may transmit uplink reference signal only on its connected beam, the first node cannot obtain signal strength of non-serving beam in this manner.

The first node may receive measurement result of the second node's beam from one or more UEs to obtain information of the second node's beam, or receive information of the second node's beam from the second node, or measure reference signal on beam of the second node. The information transmitted from the second node may be obtained by the second node in the same manner as the first node. The information of the second node's beam may comprise at least identifier, and may also comprise signal strength as option. The identifier of a beam may comprise a node-level ID and a beam-level ID when different nodes use the same beams identifiers.

In S14, the first node may store the information of the second node's beam in a neighbor beam list.

The neighbor beam list can be used for the following determination and adjustment. The neighbor beam list can be updated periodically or aperiodically according to the beam environment change such as new beam addition, old beam remove due to beam blocked, weather changes, and etc. An example of the neighbor beam list is shown in table 1.

TABLE 1

| TRP ID | Beam ID | Signal Strength |
| --- | --- | --- |
| TRP m | 1 | S1 |
| TRP m | 2 | S2 |

TABLE 1-continued

| TRP ID | Beam ID | Signal Strength |
|---|---|---|
| ... | ... | ... |
| TRP n | 5 | S5 |
| TRP n | 6 | S6 |
| ... | ... | ... |

Figure 12:
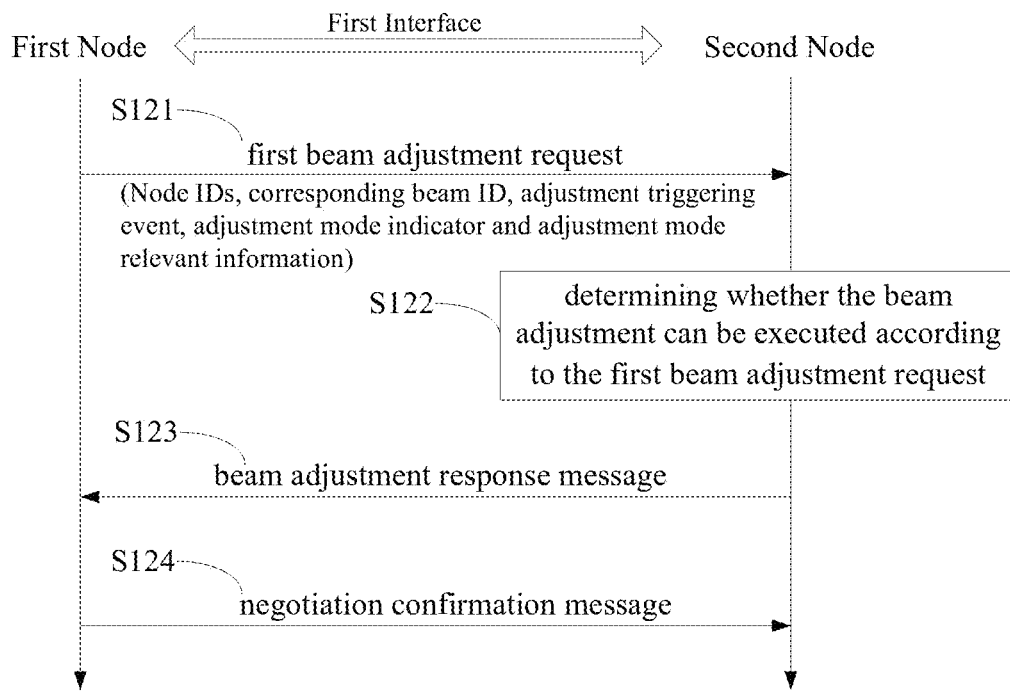
FIG. 12 is a flowchart illustrating a sixth embodiment of the method for beam adjustment according to the disclosure.

Referring now to FIG. 12, a flowchart is depicted illustrating a sixth embodiment of the method for beam adjustment according to the disclosure, which is based on the first embodiment of the method for beam adjustment and in which the block S12 further comprises the following blocks. The present embodiment can be combined with any previous embodiment of the method for beam adjustment according to the disclosure.

In S121, the first node may transmit a first beam adjustment request directly to the second node through a first interface.

The first interface is the interface between different nodes. If the first node and the second node are base stations, the first interface may be X2 interface or other inter-base station interface. If the two nodes are DUs/TRPs/TPs/RRHs, the first interface may be inter-DU/TRP/TP/RRH interface.

The first beam adjustment request may comprise identifiers of the first node and the second node, identifier of corresponding beam which needs to be adjusted, adjustment triggering event, adjustment mode indicator selected according to the adjustment triggering event and adjustment mode relevant information. The first beam adjustment request may further comprise signal strength of the corresponding beam.

The corresponding beam may comprise beam of the second node or beam of the first node and the second node. The adjustment mode indicator and adjustment mode relevant information are used to indicate how to adjust the corresponding beam. The adjustment mode indicator may represent which parameter(s) of corresponding beam need to be adjusted, while the adjustment mode relevant information may comprise absolute/relative value of the adjusted parameter(s). The adjustment mode may be one of no adjustment, gear type, power control and beam skipping. All adjustment modes and corresponding indicators can be stored as a look-up table. An example of the look-up table is shown in table 2.

TABLE 2

| Adjustment mode indicator | Adjustment mode | Description |
|---|---|---|
| 00 | Mode 1 | No adjustment |
| 01 | Mode 2 | Gear type |
| 10 | Mode 3 | Power control |
| 11 | Mode 4 | Beam skipping |

In S122, the second node may determine whether the beam adjustment can be executed by it according to the first beam adjustment request.

The second node may determine whether the beam adjustment can be executed based on its working status together with the first beam adjustment request.

In S123, the second node may transmit a beam adjustment response message directly to the first node through the first interface.

If the beam adjustment can be executed, the second node can transmit a beam adjustment response message indicating a positive feedback through the first interface; otherwise the second node can transmit a beam adjustment response message indicating a negative feedback for negotiation through the first interface. The negative beam adjustment response message may comprise adjusted parameters proposed by the second node, e.g. corresponding beam ID, adjustment mode indicator, adjustment mode relevant information, etc. In some embodiments, if the second node determines that the beam adjustment can be executed, it can execute the beam adjustment without executing present and following blocks.

In S124, the first node may transmit a negotiation confirmation message in response to the beam adjustment response message directly to the second node through the first interface.

When the beam adjustment response message is indicating the positive feedback, the second node may transmit a positive negotiation confirmation message to the first node and then the first node and/or the second node can execute the beam adjustment according to the first beam adjustment request. When the beam adjustment response message is negative, the first node may evaluate the adjusted parameters and transmit a negotiation confirmation message to the second node accordingly. If the first node agrees with the adjusted parameters according to the evaluation, it may feedback a positive negotiation confirmation message and then the first node and/or the second node may execute the beam adjustment according to the adjusted parameters proposed by the second node; otherwise the first node may feedback a negative negotiation confirmation message and the process terminates without executing the beam adjustment. In some embodiments, the first node can execute the beam adjustment without transmitting the negotiation confirmation message if the beam adjustment response message is positive.

Figure 13:
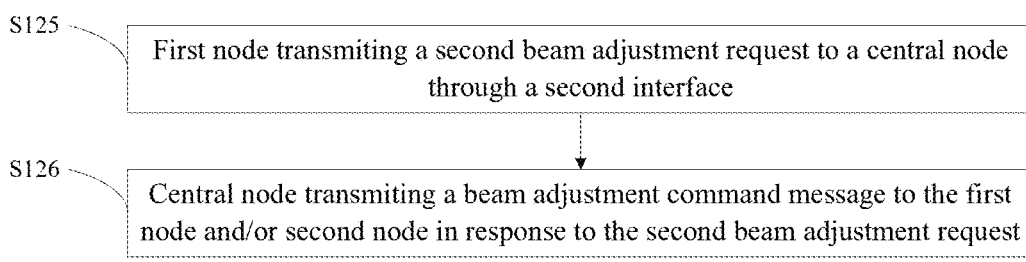
FIG. 13 is a flowchart illustrating a seventh embodiment of the method for beam adjustment according to the disclosure.

Referring now to FIG. 13, a flowchart is depicted illustrating a seventh embodiment of the method for beam adjustment according to the disclosure, which is based on the first embodiment of the method for beam adjustment and in which the block S12 further comprises the following blocks. The present embodiment can be combined with any previous embodiment except the sixth embodiment of the method for beam adjustment according to the disclosure.

In S125, the first node may transmit a second beam adjustment request to a central node through a second interface.

The first node and the second node are DUs/TRPs/TPs/RRHs, the central node is a CU or a gNB which connects to and controls the first node and the second node, and the second interface is the interface between CU/gNB and its control DUs/TRPs/TPs/RRHs. The second beam adjustment request may comprise identifiers of the first node and the second node, identifier of corresponding beam which needs to be adjusted and adjustment triggering event. The second beam adjustment request may further comprise signal strength of the corresponding beam. The corresponding beam in the second beam adjustment request may comprise beam of the first node and/or the second node.

In S126, the central node may transmit a beam adjustment command message to the first node and/or second node in response to the second beam adjustment request.

The beam adjustment command message may comprise identifier of beam which needs to be adjusted, adjustment mode indicator selected according to the adjustment triggering event and adjustment mode relevant information. For details of adjustment mode indicator and adjustment mode relevant information, see the relevant description of the sixth embodiment of the method for beam adjustment.

The central node may accept the second beam adjustment request and the IDs of the second node and corresponding beam in the beam adjustment command message may be the same as those in the second beam adjustment request. Alternatively, the central node may adjust IDs of the second node and/or the corresponding beam according to working status of the first node and the second node.

Figure 14:
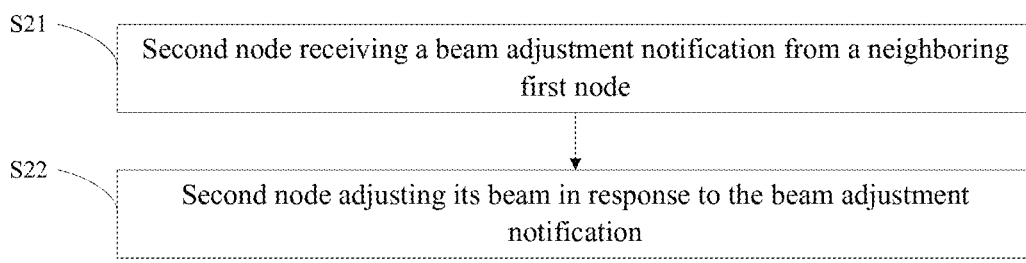
FIG. 14 is a flowchart illustrating an eighth embodiment of the method for beam adjustment according to the disclosure.

Referring now to FIG. 14, a flowchart is depicted illustrating an eighth embodiment of the method for beam adjustment according to the disclosure. The method can be implemented on a second node.

The second node may be a base station, which is connected to a core network and performs radio communications with multiple UEs thus providing communications coverage for the associated geographical area. The base station may comprise, but are not limited to, macro base stations, micro base stations, pico base stations, or femto base station. In various embodiments, a base station is also be interchangeably referred to as a wireless base station, an access point, a Node B, an eNodeB/eNB, gNB and so forth. If the radio access network is a CU/DU, or other similar architectures, the base station can be used to represent the CU and the multiple DUs under control of the CU. In CU/DU architecture, a CU connects to and controls multiple DUs, the CU and DUs both carrying an air interface protocol stack.

The second node may also be a DU in the CU/DU architecture, or a TP/TRP/RRH in other similar architectures.

The method may comprise the following blocks.

In S21, the second node may receive a beam adjustment notification from a neighboring first node.

The beam adjustment notification may be transmitted from the first node when a beam adjustment is required. The first node may be a base station or a DU/TP/TRP/RRH in a CU/DU or other similar architectures. When the first node and the second node are both DUs/TRPs/TPs/RRHs, the two nodes can connect to the same CU/gNB.

The beam adjustment may be event-triggered. A triggering event for beam adjustment may be referred as an adjustment triggering event and caused by non-uniform radio network coverage. The adjustment triggering events may comprise beam overlapped, beam blocked and beam coverage hole.

The beam adjustment notification may be transmitted from the first node directly or indirectly, refer to the sixth and seventh embodiment of the method for beam adjustment for more detail.

In S22, the second node may adjust its beam in response to the beam adjustment notification.

When an adjustment triggering event has occurred, the second node may cooperate with the first node on the beam adjustment according to the adjustment triggering event, so that the relationship between the beam of the first node and the beam of the second node meets a preset condition. The beam adjustment executed by the second node may comprise adjustment of direction and/or power of its corresponding beam which needs to be adjusted. The preset condition may comprise eliminating the adjustment triggering event.

In one embodiment, signal/channel of the second node may be transmitted in a beam-sweeping mode, and the beam adjustment may comprise adjustment of at least one of the beam's direction, power and time allocations. By beam-sweeping mode, it means that a same signal or channel is carried by at least two beams of the second node and transmitted in at least two time units in one cycle. The time allocation of a beam may comprise the length of a sweeping cycle and which time unit(s) the beam occupies in one cycle.

According to the above embodiment, when there is a problem caused by the non-uniform radio network coverage, e.g. beam overlapped, beam blocked or beam coverage hole, a beam adjustment can be executed by the first node and/or the second node accordingly, so that relationship between beam of the first node and beam of the second node meets a preset condition. The uniformity of radio network coverage can be improved through cooperation between the first node and the second node.

Referring now to FIG. 15, a flowchart is depicted illustrating a ninth embodiment of the method for beam adjustment according to the disclosure, which is based on the eighth embodiment of the method for beam adjustment and further comprise the following block before the block S21.

In S20, the second node may transmit information of its beam to the first node.

The second node may transmit the information periodically or aperiodically according to the beam environment change such as new beam addition, old beam remove due to beam blocked, weather changes, and etc.

If the information of the second node's beam comprises signal strength, the second node may obtain signal strength of its beam through receiving measurement result of its beam from one or more UEs or measuring uplink reference signal on its beam transmitted from one or more UEs. If the information of the second node's beam only comprises identifier, the second node may transmit the information to the first node without receiving measurement result or measuring.

Referring now to FIG. 16, a flowchart is depicted illustrating a tenth embodiment of the method for beam adjustment according to the disclosure. The method can be implemented on a central node. The central node may a CU/gNB in a CU/DU architecture or other similar architectures. In CU/DU architecture, a CU connects to and controls multiple DUs, the CU and DUs both carrying an air interface protocol stack. The method may comprise the following blocks.

In S31, the central node may receive a beam adjustment request from a first node.

The beam adjustment request may be transmitted from the first node when a beam adjustment is required. The beam adjustment may be event-triggered. A triggering event for beam adjustment may be referred as an adjustment triggering event and caused by non-uniform radio network coverage. The adjustment triggering events may comprise beam overlapped, beam blocked and beam coverage hole. The first node may determine whether an adjustment triggering event has occurred according to information of beam of the first node and/or a neighbor second node. The first node and the second node are distributed units DUs/TPs/TRPs/RRHs, and the central node connects to and controls the first node and the second node.

The beam adjustment request may comprise identifiers of the first node and the second node, identifier of corresponding beam which needs to be adjusted and adjustment triggering event. The beam adjustment request may further comprise signal strength of the corresponding beam.

In S32, the central node may transmit a beam adjustment command message to at least the first node or a second node to execute the beam adjustment.

The beam adjustment command message may comprise identifier of beam which needs to be adjusted, adjustment mode indicator selected according to the adjustment triggering event and adjustment mode relevant information. For details of adjustment mode indicator and adjustment mode relevant information, see the relevant description of the sixth embodiment of the method for beam adjustment. The central node may accept the second beam adjustment request and the IDs of the second node and corresponding beam in the beam adjustment command message may be the same as those in the second beam adjustment request. Alternatively, the central node may adjust IDs of the second node and/or the corresponding beam according to working status of the first node and the second node.

The first node and/or the second node may execute the beam adjustment, which may comprise adjustment of at least one of direction, power and time allocation of its corresponding beam, according to the beam adjustment command message, so that the relationship between beam of the first node and beam of the second node meets a preset condition. The preset condition may comprise eliminating the adjustment triggering event.

According to the above embodiment, when there is a problem caused by the non-uniform radio network coverage, e.g. beam overlapped, beam blocked or beam coverage hole, a beam adjustment can be executed by the first node and/or the second node accordingly, so that relationship between beam of the first node and beam of the second node meets a preset condition. The uniformity of radio network coverage can be improved through cooperation between the first node and the second node.

Referring now to FIG. 17, a block diagram is depicted illustrating a first embodiment of a node according to the disclosure. The node may comprise a determination module 11 and an adjusting module 12.

The determination module 11 may be configured to determine whether a beam adjustment is required.

The adjusting module 12 may be configured to at least adjust beam of the node or informing a neighboring second node of adjusting the second node's beam when the beam adjustment is required, so that relationship between beam of the node and beam of the second node meets a preset condition.

Specifically, the determination module 11 may be configured to determine whether a beam overlapped degree is greater than a predefined threshold so as to determine whether the beam adjustment is required. The adjusting its beam by the node or the second node may comprise adjusting at least one of direction, time allocation and power of its beam, and the preset condition comprises the beam overlapped degree being no greater than the predefined threshold.

Specifically, the beam overlapped degree may comprise at least the number of beam or signal strength of the second node's beam obtained by the node.

Specifically, the determination module 11 may be configured to determine whether a decreasing rate of the node's beam signal strength is greater than a predetermined threshold so as to determine whether the beam adjustment is required. The adjusting module 12 may be configured to decrease power of corresponding beam of the node and inform the second node of increasing power of the second node's corresponding beam, or increase power of corresponding beam of the node. The preset condition may comprise signal strength of the beam of the node or the second node being greater than a preset threshold.

Specifically, the determination module may be configured to determine whether signal strength of beam of the node is lower than a first predetermined signal strength threshold and signal strength of the second node's beam is lower than a second predetermined signal strength threshold so as to determine whether the beam adjustment is required. The adjusting its beam by the node or the second node may comprise adjusting at least direction or power of its beam, and the preset condition comprises the signal strength of at least the beam of the node or the beam of the second node being no lower than the predetermined signal strength threshold.

Specifically, the adjusting module may be configured to transmit a first beam adjustment request directly to the second node through a first interface, or transmit a second beam adjustment request to a central node through a second interface, so that the central node may transmit a beam adjustment command message to the second node in response to the second beam adjustment request.

Referring now to FIG. 18, a block diagram is depicted illustrating a second embodiment of the node according to the disclosure. The node may comprise a processor 110 and a transceiver 120 coupled to the processor 110 via a bus.

The transceiver 120 may be configured to transmit and receive data, and serve as an interface through which the node communicates with other communications equipment.

The processor 110 may control the operations of the node, and may also be referred to as a central processing unit (CPU). Processor 110 may be an integrated circuit chip with signal processing capabilities, or a general-purpose processor, digital signal processor (DSP), application specific integrated circuit (ASIC), field programmable gate array (FPGA), or other programmable logic devices, discrete gates, transistor logic devices, discrete hardware components. The general-purpose processor may be a microprocessor or any conventional processor.

The node may further comprise a memory (not shown) used to store the commands and data necessary for the operations of the processor 110. The memory can also store the data received at the transceiver 120.

The processor 110 may be configured to determine whether a beam adjustment is required; and when the beam adjustment is required, at least adjust beam of the node, or inform via the transceiver 120 a neighboring second node of adjusting beam of the second node, so that relationship between the beam of the node and the beam of the second node meets a preset condition.

Specifically, the processor 110 may be configured to determine whether a beam overlapped degree is greater than a predefined threshold so as to determine whether the beam adjustment is required; the adjusting its beam by the node or the second node may comprise adjusting at least one of direction, time allocation and power of its beam, and the preset condition may comprise the beam overlapped degree being no greater than the predefined threshold.

Specifically, the beam overlapped degree may comprise at least the number or signal strength of the second node's beam obtained by the node.

Specifically, the processor 110 may be configured to determine whether a decreasing rate of the node's beam signal strength is greater than a predetermined threshold so as to determine whether the beam adjustment is required, and decrease power of corresponding beam of the node and inform the second node of increasing power of the second node's corresponding beam, or increase power of corresponding beam of the node when the beam adjustment is required; the preset condition may comprise signal strength of beam of the node or the second node being greater than a preset threshold.

Specifically, the processor 110 may be configured to determine whether signal strength of its beam is lower than a first predetermined signal strength threshold and signal strength of the second node's beam is lower than a second predetermined signal strength threshold so as to determine whether the beam adjustment is required; the adjusting its beam by the node or the second node may comprise adjusting at least direction or power of its beam, and the preset condition may comprise the signal strength of at least the beam of the node or the beam of the second node being no lower than the predetermined signal strength threshold.

Specifically, the processor 110 may be further configured to obtain via the transceiver 120 information of at least the beam of the node or the beam of the second node before determining whether a beam adjustment is required.

Specifically, the processor 110 may be configured to receive via the transceiver 120 measurement result of beam of the node from one or more user equipments or measure via the transceiver 120 uplink reference signal on beam of the node transmitted from one or more user equipments.

Specifically, the processor 110 may be configured to receive via the transceiver 120 measurement result of the second node's beam from one or more user equipments; or receive via the transceiver 120 information of the second node's beam from the second node; or measure via the transceiver 120 reference signal on beam of the second node.

Specifically, the information of beam of the node may comprise signal strength of beam of the node; the information of the second node's beam may comprise identifier of the second node's beam.

Specifically, the information of the second node's beam may further comprise signal strength of the second node's beam.

Specifically, the processor 110 may be further configured to store the information of the second node's beam in a neighbor beam list after obtaining via the transceiver 120 the information of the second node's beam.

Specifically, the processor 110 may be configured to transmit via the transceiver 120 a first beam adjustment request directly to the second node through a first interface; or transmit via the transceiver 120 a second beam adjustment request to a central node through a second interface, so that the central node transmits a beam adjustment command message to the second node in response to the second beam adjustment request.

Specifically, the processor 110 may be further configured to receive via the transceiver 120 a beam adjustment response message from the second node through the first interface after transmitting via the transceiver 120 the first beam adjustment request directly to the second node through the first interface.

Specifically, the processor 110 may be further configured to receive via the transceiver 120 the beam adjustment command message from the central node after transmitting via the transceiver 120 the second beam adjustment request to the central node through the second interface.

Specifically, wherein the first beam adjustment request may comprise identifiers of the first node and the second node, identifier of corresponding beam which needs to be adjusted, adjustment triggering event, adjustment mode indicator selected according to the adjustment triggering event and adjustment mode relevant information; the second beam adjustment request may comprise identifiers of the first node and the second node, identifier of corresponding beam which needs to be adjusted and adjustment triggering event; the beam adjustment command message may comprise identifier of corresponding beam which needs to be adjusted, adjustment mode indicator selected according to the adjustment triggering event and adjustment mode relevant information.

Specifically, the node and the second node may be base stations; or the node and the second node may be DUs/TPs/TRPs/RRHs; or the node and the second node may be DUs/TPs/TRPs/RRHs, and the central node may be a CU/gNB which connects to and controls the node and the second node.

Specifically, signal/channel of the node may be transmitted in a beam-sweeping mode.

Figure 19:
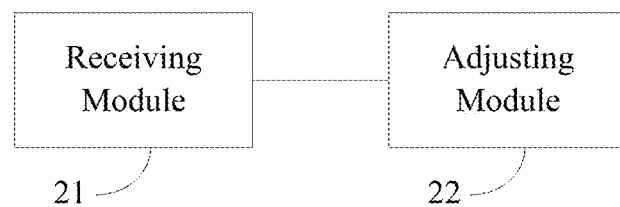
FIG. 19 is a block diagram illustrating a third embodiment of the node according to the disclosure.

Referring now to FIG. 19, a block diagram is depicted illustrating a third embodiment of a node according to the disclosure. The node may comprise a receiving module 21 and an adjusting module 22.

The receiving module 21 may be configured to receive a beam adjustment notification from a neighboring first node, wherein the beam adjustment notification is transmitted from the first node when a beam adjustment is required.

The adjusting module 22 may be configured to adjust beam of the node in response to the beam adjustment notification, so that relationship between beam of the first node and the beam of the node meets a preset condition.

Specifically, the receiving module 21 may be configured to receive a first beam adjustment request directly from the first node through a first interface; or receive a beam adjustment command message from a central node through a second interface, wherein the beam adjustment command message is transmitted from the central node in response to a second beam adjustment request from the first node.

Specifically, the adjusting its beam by the node may comprise adjusting at least one of direction, time allocation and power of its beam.

Figure 20:
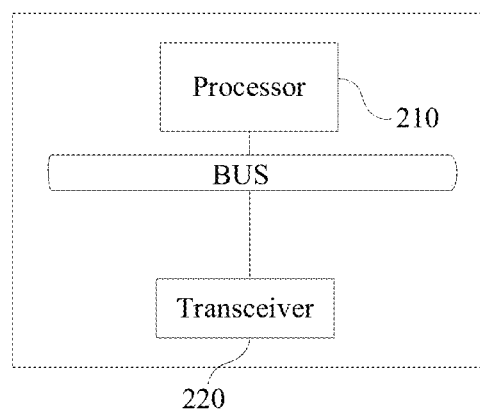
FIG. 20 is a block diagram illustrating a fourth embodiment of the node according to the disclosure.

Referring now to FIG. 20, a block diagram is depicted illustrating a fourth embodiment of the node according to the disclosure. The node may comprise a processor 210 and a transceiver 220 coupled to the processor 110 via a bus.

The transceiver 220 may be configured to transmit and receive data, and serve as an interface through which the node communicates with other communications equipment.

The processor 210 may control the operations of the node, and may also be referred to as a central processing unit (CPU). Processor 210 may be an integrated circuit chip with signal processing capabilities, or a general-purpose processor, digital signal processor (DSP), application specific integrated circuit (ASIC), field programmable gate array (FPGA), or other programmable logic devices, discrete gates, transistor logic devices, discrete hardware components. The general-purpose processor may be a microprocessor or any conventional processor.

The node may further comprise a memory (not shown) used to store the commands and data necessary for the operations of the processor 210. The memory can also store the data received at the transceiver 220.

The processor 210 may be configured to receive via the transceiver 220 a beam adjustment notification from a neighboring first node, wherein the beam adjustment notification is transmitted from the first node when a beam adjustment is required; and adjust beam of the node in response to the beam adjustment notification, so that relationship between beam of the first node and the beam of the node meets a preset condition.

Specifically, the processor 210 may be configured to receive via the transceiver 220 a first beam adjustment request directly from the first node through a first interface; or receive via the transceiver 220 a beam adjustment command message from a central node through a second interface, wherein the beam adjustment command message is transmitted from the central node in response to a second beam adjustment request from the first node.

Specifically, the processor 210 may be further configured to determine whether the beam adjustment can be executed according to the first beam adjustment request; transmit via the transceiver 220 a beam adjustment response message indicating a positive feedback through the first interface when the beam adjustment can be executed according to the first beam adjustment request, or transmit via the transceiver 220 a beam adjustment response message indicating a negative feedback for negotiation through the first interface when the beam adjustment cannot be executed according to the first beam adjustment request, after receiving via the transceiver 220 the first beam adjustment request directly from the first node through the first interface, wherein the beam adjustment response message indicating the negative feedback comprises adjusted parameters.

Specifically, the processor 210 may be further configured to receive via the transceiver 220 a negotiation confirmation message from the first node through the first interface after transmit via the transceiver 220 the beam adjustment response message indicating the negative feedback for negotiation through the first interface.

Specifically, the first beam adjustment request may comprise identifiers of the first node and the second node, identifier of corresponding beam which needs to be adjusted, adjustment triggering event, adjustment mode indicator selected according to the adjustment triggering event and adjustment mode relevant information; the second beam adjustment request may comprise identifiers of the first node and the second node, identifier of corresponding beam which needs to be adjusted and adjustment triggering event; the beam adjustment command message may comprise identifier of corresponding beam which needs to be adjusted, adjustment mode indicator selected according to the adjustment triggering event and adjustment mode relevant information.

Specifically, the first node and the node may be base stations; or the first node and the node may be DUs/TPs/TRPs/RRHs; or the first node and the node may be DUs/TPs/TRPs/RRHs, and the central node may be a CU/gNB which connects to and controls the first node and the node.

Specifically, the adjusting its beam by the node may comprise adjusting at least one of direction, time allocation and power of its beam.

Specifically, the processor 210 may be further configured to transmit via the transceiver 220 information of its beam to the first node before receiving via the transceiver 220 the beam adjustment notification from the first node, wherein the information of its beam is obtained through receiving measurement result of its beam from at least a user equipment or measuring uplink reference signal on its beam transmitted from one or more user equipments.

Specifically, signal/channel of the node may be transmitted in a beam-sweeping mode.

Figure 21:
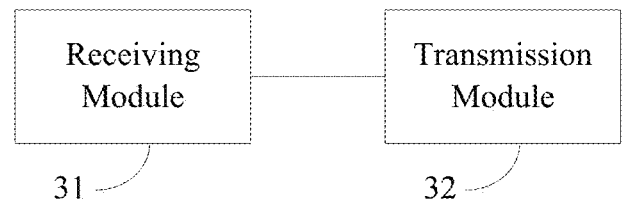
FIG. 21 is a block diagram illustrating a fifth embodiment of the node according to the disclosure.

Referring now to FIG. 21, a block diagram is depicted illustrating a fifth embodiment of a node according to the disclosure. The node may comprise a receiving module 31 and a transmission module 32.

The receiving module 31 may be configured to receive a beam adjustment request from a first node, wherein the beam adjustment request is transmitted when a beam adjustment is required.

The transmission module 32 may be configured to transmit a beam adjustment command message to at least the first node or a second node to execute the beam adjustment, so that relationship between beam of the first node and beam of the second node meets a preset condition.

Figure 22:
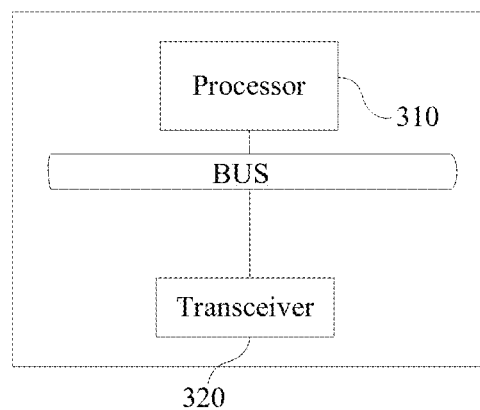
FIG. 22 is a block diagram illustrating a sixth embodiment of the node according to the disclosure.

Referring now to FIG. 22, a block diagram is depicted illustrating a sixth embodiment of the node according to the disclosure. The node may comprise a processor 310 and a transceiver 320 coupled to the processor 310 via a bus.

The transceiver 320 may be configured to transmit and receive data, and serve as an interface through which the node communicates with other communications equipment.

The processor 310 may control the operations of the node, and may also be referred to as a central processing unit (CPU). Processor 310 may be an integrated circuit chip with signal processing capabilities, or a general-purpose processor, digital signal processor (DSP), application specific integrated circuit (ASIC), field programmable gate array (FPGA), or other programmable logic devices, discrete gates, transistor logic devices, discrete hardware components. The general-purpose processor may be a microprocessor or any conventional processor.

The node may further comprise a memory (not shown) used to store the commands and data necessary for the operations of the processor 310. The memory can also store the data received at the transceiver 320.

The processor 310 may be configured to receive via the transceiver 320 a beam adjustment request from a first node, wherein the beam adjustment request is transmitted when a beam adjustment is required; and transmit via the transceiver 320 a beam adjustment command message to at least the first node or a second node to execute the beam adjustment, so that relationship between beam of the first node and beam of the second node meets a preset condition.

Specifically, the beam adjustment request may comprise identifier of at least the first node or the second node, identifier of corresponding beam which needs to be adjusted and adjustment triggering event; the beam adjustment command message may comprise identifier of corresponding beam which needs to be adjusted, adjustment mode indicator selected according to the adjustment triggering event and adjustment mode relevant information.

Specifically, the beam adjustment executed by the first node or the second node may comprise adjustment of at least one of direction, time allocation and power of its beam.

Specifically, the first node and the second node may be DUs/TPs/TRPs/RRHs, and the node may be a CU/gNB which connects to and controls the first node and the second node.

For details of functions of various components or modules of the node according to the present embodiment, see the relevant description of the corresponding embodiment of the method for beam adjustment.

It can be appreciated that the nodes and methods disclosed herein can also be implemented in other forms. Rather, the nodes as described are merely illustrative. For example, the division of modules or units is performed solely based on logic functions, thus in actual implementations there may be other division methods, e.g., multiple units or components may be combined or integrated onto another system, or some features may be ignored or simply not executed. In addition, mutual couplings, direct couplings, or communications connections as displayed or discussed may be achieved through some interfaces, devices, or units, and may be achieved electrically, mechanically, or in other forms.

Separated units as described may or may not be physically separated. Components displayed as units may or may not be physical units, and may reside at one location or may be distributed to multiple networked units. Part or all of the units may be selectively adopted according to actual requirements to achieve objectives of the disclosure.

Additionally, various functional units described herein may be integrated into one processing unit or may be present as a number of physically separated units, and two or more units may be integrated into one. The integrated units may be implemented by hardware or as software functional units.

If the integrated units are implemented as software functional units and sold or used as standalone products, they may be stored in a computer readable storage medium or a baseband processor firmware. On the basis of such an understanding, the essential technical solution or all or part of the technical solution of the disclosure may be embodied as software products or baseband processors. Computer software products can be stored in a storage medium or a baseband processor firmware and can include multiple instructions enabling a computing device (e.g., a personal computer, a server, a network device, etc.) or a processor to execute all or part of the methods as described in the disclosure. The storage medium may include all kinds of media that can store program codes, such as a USB flash disk, mobile hard drive, read-only memory (ROM), random access memory (RAM), magnetic disk, or optical disk.

The above description merely illustrates some exemplary embodiments of the disclosure, which however are not intended to limit the scope of the disclosure to these specific embodiments. Any equivalent structural or flow modifications or transformations made to the disclosure, or any direct or indirect applications of the disclosure on any other related fields, shall all fall in the scope of the disclosure.

The invention claimed is:

1. A method for beam adjustment, comprising:
   determining, by a first node, whether a beam adjustment is required; and
   when the beam adjustment is required, informing, by the first node, a neighboring second node of adjusting the second node's beam, so that a relationship between a beam of the first node and the beam of the second node meets a preset condition;
   wherein the informing the second node of adjusting the second node's beam comprises:
   transmitting, by the first node, a first beam adjustment request directly to the second node through a first interface; or
   transmitting, by the first node, a second beam adjustment request to a central node through a second interface, so that the central node transmits a beam adjustment command message to the second node in response to the second beam adjustment request;
   wherein the first beam adjustment request comprises identifiers of the first node and the second node, an identifier of a corresponding beam which needs to be adjusted, an adjustment mode indicator, and adjustment mode relevant information;
   the second beam adjustment request comprises the identifiers of the first node and the second node, and the identifier of the corresponding beam which needs to be adjusted; and
   the beam adjustment command message comprises the identifier of the corresponding beam which needs to be adjusted, the adjustment mode indicator, and the adjustment mode relevant information; and
   the adjustment mode indicator indicates one beam adjustment mode among a plurality of beam adjustment modes in a look-up table, and represents which parameter of the corresponding beam to be adjusted, and the look-up table comprises a plurality of adjustment mode indicator values, each of which is associated with one of the plurality of beam adjustment modes.

2. The method according to claim 1, wherein the determining whether the beam adjustment is required comprises:
   determining, by the first node, whether a beam overlapped degree is greater than a predefined threshold;
   when the beam overlapped degree is greater than the predefined threshold, determining, by the first node, that the beam adjustment is required;
   wherein the method further comprises adjusting its beam by the first node or the second node which comprises adjusting at least one of direction, time allocation and power of its beam, and the preset condition comprises the beam overlapped degree being no greater than the predefined threshold.

3. The method according to claim 2, wherein the beam overlapped degree comprises at least the number or signal strength of the second node's beam obtained by the first node.

4. The method according to claim 1, wherein the determining whether the beam adjustment is required comprises:
   determining, by the first node, whether signal strength of its beam is lower than a first predetermined signal strength threshold and signal strength of the second node's beam is lower than a second predetermined signal strength threshold;
   when the signal strength of its beam is lower than the first predetermined signal strength threshold and the signal strength of the second node's beam is lower than the second predetermined signal strength threshold, determining, by the first node, that the beam adjustment is required;
   wherein the method further comprises the first node adjusting its beam by the first node or the second node which comprises adjusting at least direction or power of its beam, and the preset condition comprises the signal strength of at least the beam of the first node or the beam of the second node being no lower than the predetermined signal strength threshold.

5. The method according to claim 1, further comprising, before the determining whether the beam adjustment is required:
   obtaining, by the first node, information of at least its beam or the second node's beam.

6. The method according to claim 5, wherein the obtaining the beam information of the first node comprises:
   receiving, by the first node, measurement result of its beam from at least a user equipment; or
   measuring, by the first node, uplink reference signal on its beam transmitted from at least a user equipment.

7. The method according to claim 5, wherein the obtaining beam information of the second node comprises:
   receiving, by the first node, measurement result of the second node's beam from at least a user equipment; or
   receiving, by the first node, information of the second node's beam from the second node; or
   measuring, by the first node, reference signal on the second node's beam.

8. The method according to claim 5, wherein the information of beam of the first node comprises signal strength of beam of the first node; the information of the second node's beam comprises identifier of the second node's beam.

9. The method according to claim 8, wherein the information of the second node's beam further comprises signal strength of the second node's beam.

10. The method according to claim 5, further comprises, after the obtaining information of the second node's beam:
    storing, by the first node, the information of the second node's beam in a neighbor beam list.

11. The method according to claim 1, further comprising, after the transmitting the first beam adjustment request directly to the second node through the first interface:
receiving, by the first node, a beam adjustment response message from the second node through the first interface.

12. The method according to claim 1, further comprising, after the transmitting the second beam adjustment request to the central node through the second interface:
receiving, by the first node, the beam adjustment command message from the central node.

13. The method according to claim 1, wherein the adjustment mode indicator is selected according to an adjustment triggering event and the adjustment mode relevant information.

14. The method according to claim 1, wherein the first node and the second node are base stations; or
the first node and the second node are two nodes selected from distributed units, transmission points, transmission reception points, and radio remote heads; or
the first node and the second node are two nodes selected from distributed units, transmission points, transmission reception points, and radio remote heads, and the central node is a central unit or a gNB which connects to and controls the first node and the second node.

15. The method according to any one of claims 1-3, 4, wherein the first node is in a beam-sweeping mode.

16. A base station comprising:
a first node serving as a distributed unit configured to determine whether a beam adjustment is required;
a second node serving as another distributed unit; and
a central node serving as a central unit;
wherein the first node is configured to inform the neighboring second node of adjusting the second node's beam when the beam adjustment is required, so that a relationship between a beam of the first node and the beam of the second node meets a preset condition;
wherein the first node in informing the second node of adjusting the second node's beam is further configured to:
transmit a first beam adjustment request directly to the second node through a first interface; or
transmit a second beam adjustment request to the central node through a second interface, so that the central node transmits a beam adjustment command message to the second node in response to the second beam adjustment request;
wherein the first beam adjustment request comprises identifiers of the first node and the second node, an identifier of a corresponding beam which needs to be adjusted, an adjustment mode indicator, and adjustment mode relevant information;
the second beam adjustment request comprises the identifiers of the first node and the second node, and the identifier of the corresponding beam which needs to be adjusted; and
the beam adjustment command message comprises the identifier of the corresponding beam which needs to be adjusted, the adjustment mode indicator, and the adjustment mode relevant information; and
the adjustment mode indicator indicates one beam adjustment mode among a plurality of beam adjustment modes in a look-up table, and represents which parameter of the corresponding beam to be adjusted, and the look-up table comprises a plurality of adjustment mode indicator values, each of which is associated with one of the plurality of beam adjustment modes.

17. The base station according to claim 16, wherein the first node is configured to determine whether a beam overlapped degree is greater than a predefined threshold so as to determine whether the beam adjustment is required;
the first node is further configured to adjust at least one of direction, time allocation and power of its beam, and the preset condition comprises the beam overlapped degree being no greater than the predefined threshold.

18. The base station according to claim 17, wherein the beam overlapped degree comprises at least the number or signal strength of the second node's beam obtained by the first node.

19. The base station according to claim 16, wherein the first node is configured to determine whether a decreasing rate of the first node's beam signal strength is greater than a predetermined threshold so as to determine whether the beam adjustment is required;
the first node is configured to decrease power of a corresponding beam of the first node and inform the second node of increasing power of the second node's corresponding beam, or increase power of the corresponding beam of the first node;
wherein the preset condition comprises signal strength of the beam of the first node or the second node being greater than a preset threshold.

20. The base station according to claim 16, wherein the first node is configured to determine whether signal strength of beam of the first node is lower than a first predetermined signal strength threshold and signal strength of the second node's beam is lower than a second predetermined signal strength threshold so as to determine whether the beam adjustment is required;
the first node is further configured to adjust at least direction or power of its beam, and the preset condition comprises the signal strength of at least the beam of the first node or the beam of the second node being no lower than the predetermined signal strength threshold.

21. The base station according to claim 16, wherein the adjustment mode indicator is selected according to an adjustment triggering event and the adjustment mode relevant information.

22. A node, comprising a processor and a transceiver coupled to the processor; the processor being configured to:
determine whether a beam adjustment is required; and
when the beam adjustment is required, inform via the transceiver a neighboring second node of adjusting the second node's beam, so that a relationship between a beam of the node and the beam of the second node meets a preset condition;
wherein informing the second node of adjusting the second node's beam comprises:
transmitting, by the node, a first beam adjustment request directly to the second node through a first interface; or
transmitting, by the node, a second beam adjustment request to a central node through a second interface, so that the central node transmits a beam adjustment command message to the second node in response to the second beam adjustment request;
wherein the first beam adjustment request comprises identifiers of the node and the second node, an identifier of a corresponding beam which needs to be adjusted, an adjustment mode indicator, and adjustment mode relevant information;
the second beam adjustment request comprises the identifiers of the node and the second node, and the identifier of the corresponding beam which needs to be adjusted; and the beam adjustment command message comprises the identifier of the corresponding beam which needs to be adjusted, the adjustment mode indicator, and the adjustment mode relevant information; and the adjustment mode indicator indicates one beam adjustment mode among a plurality of beam adjustment modes in a look-up table, and represents which parameter of the corresponding beam to be adjusted, and the look-up table comprises a plurality of adjustment mode indicator values, each of which is associated with one of the plurality of beam adjustment modes.

23. The node according to claim 22, wherein the processor is configured to determine whether a decreasing rate of the node's beam signal strength is greater than a predetermined threshold so as to determine whether the beam adjustment is required, and decrease power of a corresponding beam of the node and inform the second node of increasing power of the second node's corresponding beam, or increase power of the corresponding beam of the node when the beam adjustment is required; wherein the preset condition comprises signal strength of beam of the node or the second node being greater than a preset threshold.

24. The node according to claim 22, wherein the processor is configured to determine whether signal strength of its beam is lower than a first predetermined signal strength threshold and signal strength of the second node's beam is lower than a second predetermined signal strength threshold so as to determine whether the beam adjustment is required; wherein the processor is further configured to execute adjusting its beam by the node or the second node which comprises adjusting at least direction or power of its beam, and the preset condition comprises the signal strength of at least the beam of the node or the beam of the second node being no lower than the predetermined signal strength threshold.

25. The node according to claim 22, wherein the processor is further configured to obtain via the transceiver information of at least the beam of the node or the beam of the second node before determining whether the beam adjustment is required.

26. The node according to claim 25, wherein the processor is configured to receive via the transceiver measurement result of beam of the node from at least a user equipment or measure via the transceiver uplink reference signal on beam of the node transmitted from at least a user equipment.

27. The node according to claim 25, wherein the processor is configured to receive via the transceiver measurement result of the second node's beam from at least a user equipment; or receive via the transceiver information of the second node's beam from the second node; or measure via the transceiver reference signal on the second node's beam.

28. The node according to claim 25, wherein the information of beam of the node comprises signal strength of beam of the node; the information of the second node's beam comprises identifier of the second node's beam.

29. The node according to claim 28, wherein the information of the second node's beam further comprises signal strength of the second node's beam.

30. The node according to claim 25, wherein the processor is further configured to store the information of the second node's beam in a neighbor beam list after obtaining via the transceiver the information of the second node's beam.

31. The node according to claim 22, wherein the processor is further configured to receive via the transceiver a beam adjustment response message from the second node through the first interface after transmitting via the transceiver the first beam adjustment request directly to the second node through the first interface.

32. The node according to claim 22, wherein the processor is further configured to receive via the transceiver the beam adjustment command message from the central node after transmitting via the transceiver the second beam adjustment request to the central node through the second interface.

33. The node according to claim 22, wherein the adjustment mode indicator is selected according to an adjustment triggering event and the adjustment mode relevant information.

34. The node according to claim 22, wherein the node and the second node are base stations; or the node and the second node are two nodes selected from distributed units, transmission points, transmission reception points, and radio remote heads; or the node and the second node are two nodes selected from distributed units, transmission points, transmission reception points, and radio remote heads, and the central node is a central unit or a gNB which connects to and controls the node and the second node.

35. The node according to any one of claims 22, 23-24, wherein the processor is in a beam-sweeping mode.

* * * * *